Jan. 14, 1964     C. J. HOLTKAMP     3,118,044
CONTROL FOR COOKING APPARATUS
Filed Nov. 10, 1960     3 Sheets-Sheet 1
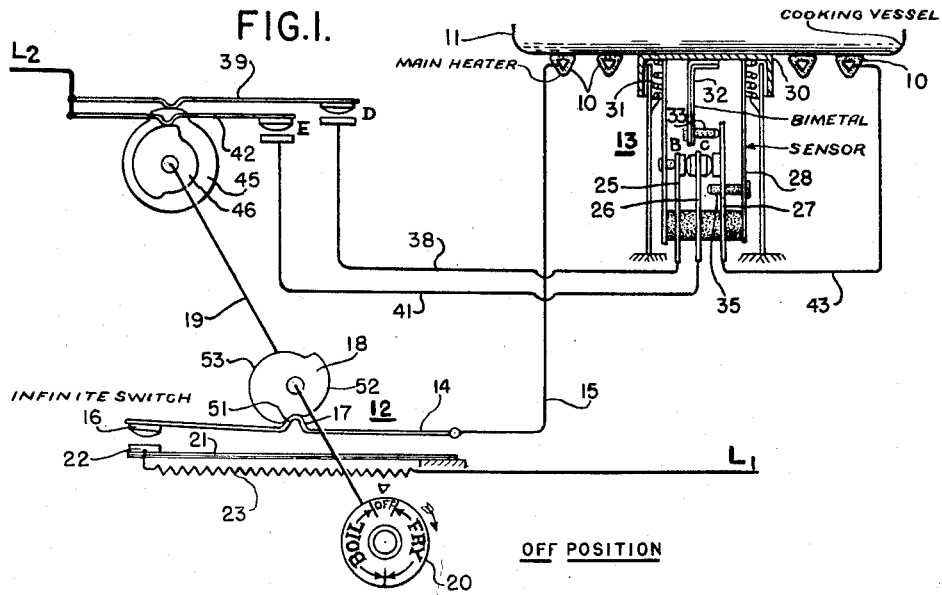
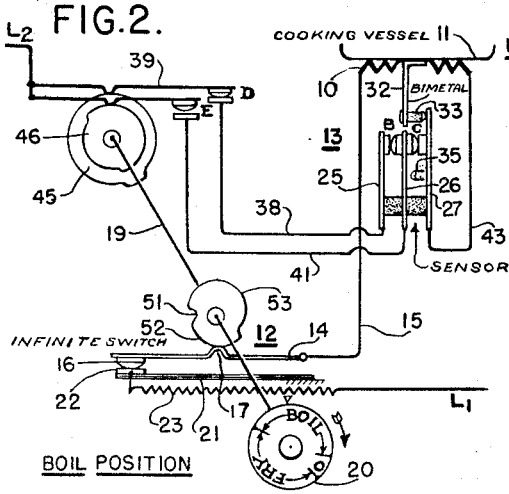
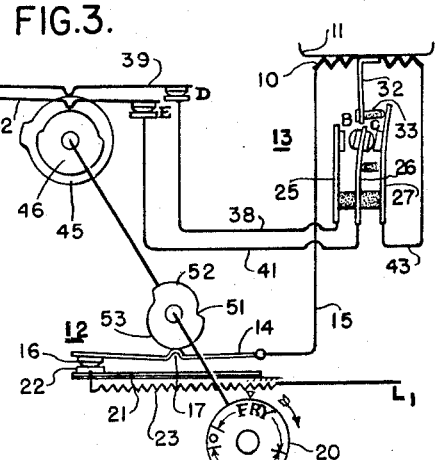
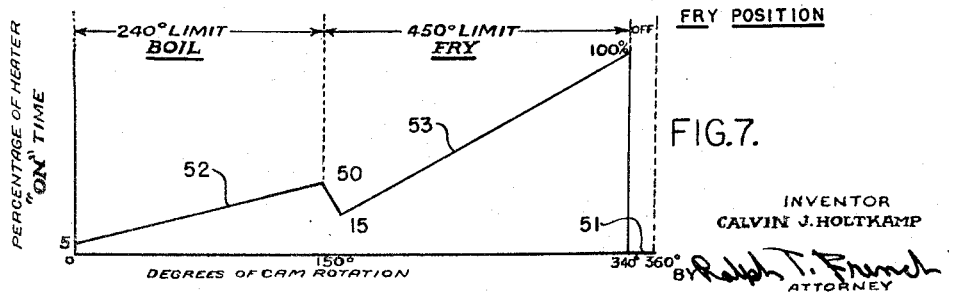
INVENTOR
CALVIN J. HOLTKAMP
BY Ralph T. French
ATTORNEY

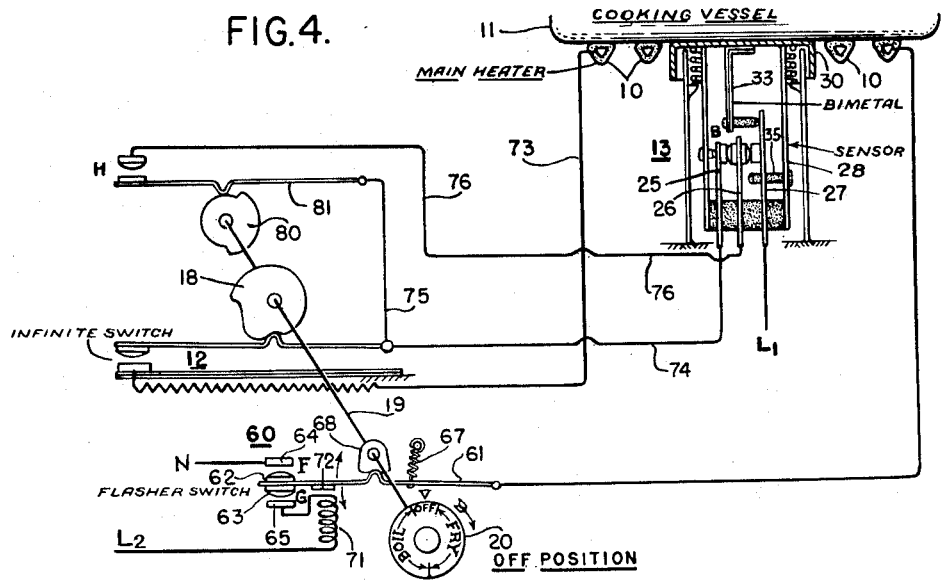
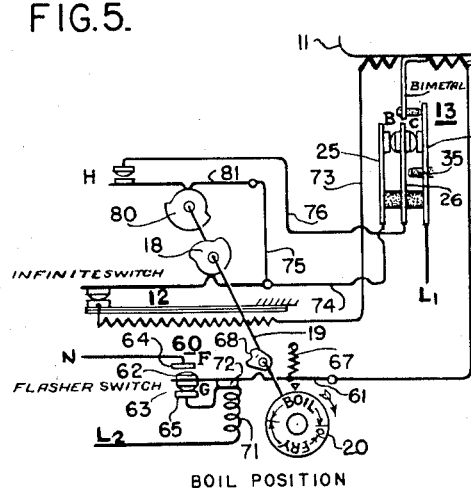
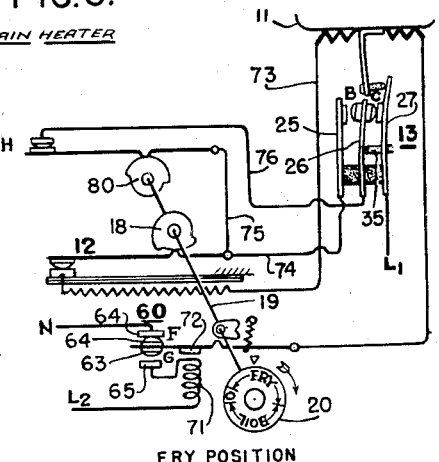
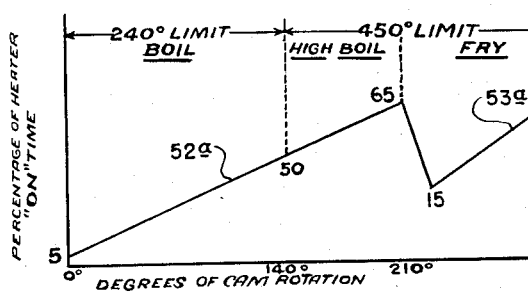

United States Patent Office 3,118,044
Patented Jan. 14, 1964

3,118,044
CONTROL FOR COOKING APPARATUS
Calvin J. Holtkamp, Mansfield, Ohio, assignor to Westinghouse Electric Corporation, East Pittsburgh, Pa., a corporation of Pennsylvania
Filed Nov. 10, 1960, Ser. No. 68,536
9 Claims. (Cl. 219—20)

This application is a continuation-in-part of my copending application Serial No. 782,861, filed December 24, 1958.

This invention relates to control apparatus for surface heaters of electric ranges, more particularly to variable wattage controls, and has for an object to provide for such controls a temperature limiting mechanism which will function satisfactorily and yet can be produced at relatively low cost.

The invention provides, for a surface heater control of the variable wattage type, means for terminating the supply of current to the heater in the event the temperature of a vessel on the heater exceeds a predetermined top safe temperature, together with means for effecting a predetermined change in the top temperature limit concurrently with a predetermined change in the setting of the variable wattage control.

The invention further provides, for a surface heater control of the variable wattage type, means for delivering full wattage to the heater until the temperature of a vessel being heated thereon approaches the usual cooking temperature, such as the boiling point of water.

More specifically, the present invention provides, for a variable wattage control having a wide range of wattage input or percentage of "on" time, for example, a range of from 2 to 100 percent of "on" time, a temperature limit control effective primarily in the event of an undesired occurrence in the cooking program, for example the boiling away of all liquid in the cooking vessel or the overheating of the food to the point where there is danger of its burning. Under such emergency conditions, the top temperature limiting device becomes effective to interrupt the circuit to the heater to prevent any further energization thereof until the temperature of the vessel has dropped to below the preselected top temperature limit. To render such a control suitable for use in conventional domestic ranges, it is desirable that the top temperature limit control have at least two different top temperature limits, for example, one for the lower portion of the variable wattage range, say 2 to 50 percent of "on" time and a higher top temperature limit for the upper portion of the range of wattage input, say 15 to 100 percent "on" time. The invention may further provide a single control or selector knob to be manually adjusted by the user for not only selecting the desired wattage setting or percentage of "on" time of the heater, but to concurrently select the predetermined top temperature limit in accordance with the selected wattage input. However, the invention is also applicable to a control utilizing a plurality of push buttons to provide a plurality of wattage inputs with these push buttons concurrently selecting the predetermined top temperature limit for the selected wattage input.

In a specific embodiment herein illustrated by way of example (FIGS. 1, 2, 3 and 7), the variable wattage control incorporates a cycling switch of the infinite type which, in effect, provides two ranges of wattage inputs or percentages of "on" time, the lower range covering percentages of "on" time from 2 to 50 percent and the upper range covering percentages of "on" time from 15 to 100 percent. For the convenience of the user, these ranges are indicated on the control or selector knob or dial as "boil" and "fry," respectively. The top temperature limiting device in this embodiment is arranged to cut off input of current to the heater in the event the temperature of the vessel exceeds 240° F. at any time that the selector switch is positioned within the "boil" range and to cut off the supply of current to the heater when the vessel reaches a temperature of 450° F. at any time that the selector is set in the "fry" range.

While, as previously mentioned, the temperature limit control is effective primarily in the event of an undesired occurrence in the cooking program, it may also be relied upon under normal conditions when baking cakes and other foods having high flour and shortening contents. The top temperature limiting device then functions as a temperature control at the 240° limit.

In another specific embodiment herein illustrated by way of example (FIGS. 9 and 10), there are also two ranges of wattage inputs with different temperature limits for these ranges, and, in addition, there is a switch for providing high heat continuously until the temperature of the vessel approaches cooking temperature. This embodiment provides most or all of the advantages of the several types of surface unit controls responsive to vessel temperature that have been marketed and provides a definite advantage over some of such controls. It automatically provides high heat for preheating, in order that this may be done quickly, and it protects against over-temperature, as when a vessel boils dry. It has the advantage over most of the other controls in that the desired wattage may be maintained for a boiling operation. This is useful, since boiling operations constitute a major portion of the use of a surface unit. The wattage provided for boiling by this control is maintained and is not affected by varying temperature conditions, such as different conductivity of the vessel and the temperature responsive element, as in some of the other controls that have been marketed.

The foregoing and other objects are effected by the invention as will be apparent from the following description and claims taken in connection with the accompanying drawings, forming a part of this application, in which:

FIG. 1 is a schematic view of a control for an electric range surface heater, incorporating the present invention, with the movable parts thereof in the positions they occupy in the "off" position;

FIG. 2 is a schematic view of the control of FIG. 1, but showing the movable parts in their "boil" positions;

FIG. 3 is a schematic view of the control of FIGS. 1 and 2, but showing the movable parts in their "fry" positions;

FIG. 4 is a schematic view of a control of the general type shown in FIG. 1 including the addition of a flasher switch, with the movable parts in the positions they occupy in the "off" position;

FIG. 5 is a schematic view of the control of FIG. 4, in its "boil" position, and while flashing;

FIG. 6 is a schematic view of the control of FIGS. 4 and 5, in its "fry" position;

FIG. 7 is a graph illustrating the design of the infinite switch adjusting cam which effects overlapping of the ranges of percentages of "on" time;

FIG. 8 is a graph similar to that of FIG. 7, illustrating a modified cam;

*FIGS. 1 to 3*

Figure 9:
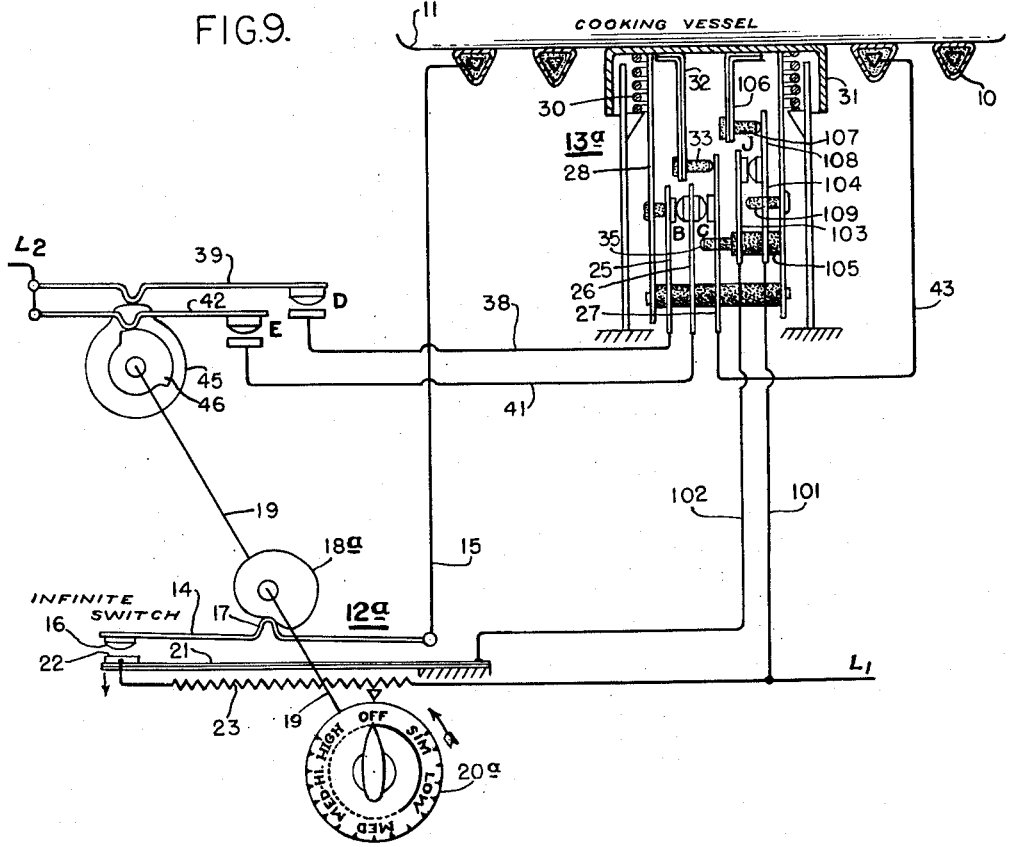
FIG. 9 is a schematic view of a control similar to that shown in FIG. 1, but including mechanism for effecting preheat.

Referring to the drawings in greater detail, particularly to FIG. 1 thereof, there is shown an electric range surface heater 10 of the sheathed type adapted to support a vessel 11 to heat the contents thereof.

The control system for the heater 10 includes a variable wattage switch 12 connected to line conductor L1 and a temperature sensor and limiter 13 connected to line conductor L2, the line conductors L1 and L2 providing a source of electrical power. The variable wattage switch 12 is of the infinite type and includes a resilient contact arm 14 fixed at one end and carrying a contact 16 at its free end. Conductor 15 connects the fixed end of arm 14 with heater 10. The arm 14 has a cam follower 17 biased by the natural resiliency of the arm into engagement with a cam 18 on a shaft 19. A manually operable selector knob 20 on the shaft 19 provides for adjustment of cam 18 and consequent positioning of contact 16.

The infinite switch 12 also includes a bimetal 21 fixed at one end and carrying at its free end a contact 22 adapted to cooperate with the contact 16 for controlling a circuit from line conductor L1 to the heater 10. The bimetal 21 is so constructed that upon being heated it deflects in a direction tending to move the contact 22 out of engagement with the cooperating contact 16. A heater 23, disposed in the circuit from line conductor L1 to the heater 10, when energized, raises the temperature of the bimetal 21 to effect movement of the contact 22 away from the contact 16 to open the circuit. With the circuit open, the heater 23 is deenergized, thereby permitting the bimetal 21 to cool and return to a position in which the contacts 16 and 22 engage and reestablish the circuit for repetition of the cycle.

From the above description of the infinite switch 12, it will be apparent that repositioning of contact 16 by cam 18 closer to contact 22 increases the percentage of "on" time of the switch, since the bimetal 21 must be heated for a longer period of time to raise its temperature to the higher level required to effect the greater deflection of contact 22 needed to separate it from lowered contact 16. Conversely, repositioning of contact 16 by cam 18 in the direction away from contact 22 decreases the percentage of "on" time of the switch 12.

The temperature limiter 13 includes three contact arms 25, 26 and 27 secured in stacked and electrically-insulated relation within a cylindrical casing 28. The arm 27 is self-biased to the left as viewed in the various figures, while arm 26 is self-biased to the right, with the biasing force of arm 27 stronger than that of arm 26. The arms 25 and 26 carry at their free ends cooperating contacts providing a switch B. Similarly, the arms 26 and 27 carry at their free ends cooperating contacts providing a switch C.

The temperature limiter 13 includes a cap 30 for the casing 28, having limited vertical movement and adapted to be biased, by compression spring 31, into engagement with the bottom of a cooking vessel 11 disposed on the heater 10. Depending from the cap 30 is a bimetal 32 which carries at its lower free end an insulating pin 33 for engagement with the arm 27. The cap 30 and the bimetal 32 sense the temperature of the vessel or pan 11, and as the temperature of the bimetal increases, its free end moves to the right, as viewed in the drawings, and moves arm 27 to the right. Since arm 26 is self-biased away from arm 25, initial movement of the bimetal 32 and the arm 27 to the right effects opening of the switch B. Continued movement of bimetal 32 and arm 27 to the right opens switch C, after arm 26 engages stop member 35.

The contact arms 25 and 26 are connected with the line conductor L2 by conductor 38, line switch D and contact arm 39, and by conductor 41, line switch E and contact arm 42, respectively. Contact arm 27 is connected with the surface heater 10. The line switches D and E close by the inherent resiliency of their contact arms 39 and 42, respectively, and are opened by cams 45 and 46, respectively, carried by the shaft 19 of the manually operable selector knob 20.

By the apparatus described above, there is provided for the surface heater 10 an electrical circuit between L1 and L2 via the variable wattage switch 12, conductor 15, heater 10, conductor 43, temperature limiter 13 and either conductor 38, switch D and arm 39 or conductor 41, switch E and arm 42, depending on the position of the manually adjustable selector knob 20.

The cam 18, which positions the contact 16 of the variable wattage switch 12, has an effective surface which is made up of three portions. The lowermost portion is indicated at 51, and when the cam follower 17 of the switch 12 engages this portion of the cam surface, the contact arm 14 of the cycling switch moves under its inherent resilience to separate the contacts 16 and 22, thereby opening the switch. This portion of the cam surface is indicated by the legend "off" on the corresponding portion of the manually operable selector knob or dial 20.

As the selector knob and its associated cam 18 are turned clockwise, the follower 17 will engage a portion of the cam surface indicated by the reference character 52, this portion being indicated on the knob or dial 20 by the legend "boil." The cam surface in this zone increases in distance from the axis of the cam throughout its movement to position the contact arm 14 of the infinite switch progressively lower, as viewed in the drawings, thereby increasing the percentage of "on" time of the cycling switch in the manner previously explained.

Similarly, a remaining portion 53 of the cam surface provides an additional range of switch operation which is indicated as "fry" on the knob or indicator 20, this portion 53 of the cam surface functioning to position the contact arm 14 and its contact 16 through a range of positions lower than those provided by the preceding cam surface portion 52, with the result that in the "fry" range, the percentage of "on" time of the cycling switch is increased over that provided in the "boil" range.

FIG. 7 represents graphically the above-discussed arrangement of portions of the cam operating surface. In this figure, the horizontal line at the extreme right corresponds to the "off" position of the cam surface and is given the same reference character 51. Similarly, the cam surface portion 52, which controls the cycling switch during the "boil" range of operation, is shown at the left of the figure. The reference character 53 has been applied to the inclined line which represents the similarly referenced portion of the cam surface which controls the position of the cycling switch contact 16, and hence the percentage of "on" time of the switch, during the "fry" range of cooking operation.

FIG. 7 further illustrates graphically that the ranges of percentage of "on" time of the heater provided during "boil" and during "fry" may overlap, if desired. By way of example, FIG. 7 shows the "boil" range of operation of the infinite switch as covering percentages of "on" time varying from 2 to 50 with the "fry" range providing for percentages of "on" time varying from 15 to 100.

Referring to FIGS. 2 and 7, it will be seen that when the manual selector knob 20 is rotated from its "off" position to "boil" position, not only does the cam 18 position the contact 16 of the cycling switch to provide the desired percentage of "on" time of the heater, but the cam 45 closes the switch D.

While the control is set for "boil," the switch E will remain open, thereby establishing circuitry for "boil" operation from L1 through infinite switch 12, conductor 15, heater 10, conductor 43, contact arm 27, switches C and B, contact arm 25, conductor 38, switch D and contact arm 39 to L2. The positions of the various switches for the above-described "boil" operation are best shown in FIG. 2.

The temperature limiter 13 is so designed as to open the switch B in the event liquid in the vessel being heated should boil away, resulting in a dry pan which could readily overheat. Preferably, this limiter is designed to open the switch B at a temperature of 240°, which is sufficiently high to permit normal cooking operations that would come within the "boil" range, and yet which will protect the vessel from damage in the event it boils dry and which will also prevent burning of food therein for at least a reasonable period after such temperature has been reached. With the controls set as indicated in FIG. 2 for cooking in the "boil" range, opening of the switch B upon the temperature of the vessel reaching 240° will open the circuitry between the heater 10 and its power source, thereby preventing any further heating of the vessel until the latter has cooled sufficiently to permit the switch B to close and re-establish the circuitry to the heater.

As the control knob is moved from its "boil" position to its "fry" position (shown in FIG. 3), the cam 46 permits the switch E to close, thereby providing circuitry for the heater 10 which will bypass the switch B. When cooking in the "fry" range, it is to be expected that the vessel temperatures will be mostly above 240°, the temperature limit for the "boil" zone. When temperatures in excess of 240° are present in the vessel, the switch B will open, but since the switch E is now closed, circuitry is provided for the heater from L2 which bypasses the open switch B via the switch E, switch C and the infinite switch 12, thereby permitting suitable "fry" temperatures for the vessel for normal cooking in that range. However, should the temperature of the vessel exceed a preselected temperature limit for the fry range, for example, 450° F., the switch C will open, thereby preventing any flow of current to the heater until the vessel has cooled sufficiently below 450° F. to permit the switch C to close and reestablish a circuit to the heater.

It is recognized that, under certain conditions of "boil" operation, for example, when boiling a large quantity of liquid, it may be desirable to provide a higher temperature limit than 240° F. or whatever other temperature may have been selected as a limit for the "boil" range. Accordingly, the cam 18 of the manual control may be designed and so related to the cam 46 that there is provided, in effect, a "high boil" zone which is controlled, insofar as the temperature limiter is concerned, by the higher limit of 450° F. This design and arrangement is illustrated in FIG. 8, where the "boil" portion 52a of the cam 18 extends through both a "boil" range and a "high boil" range, with the temperature limit of 240° F. being effective only during the "boil" range. The "high boil" range and the "fry" range both are limited by the 450° F. temperature limit. In this arrangement of FIG. 8 as well as in the previously illustrated arrangement of FIG. 7, the ranges of percentage of "on" time of the heater overlap. In FIG. 8, the percentage of "on" time for the combined "boil" and "high boil" ranges varies from 2 to 65, while the percentage of "on" time for the 'fry" range varies from 15 to 100.

*FIGS. 4 to 6*

There are situations where it is desirable to modify the control above described to provide for flashing or overenergization of the heater for a short period at the beginning of a heating operation to bring the heater to the desired operating temperature as quickly as possible. Accordingly, there is illustrated in FIGS. 4, 5 and 6 a modification of the previously-described control wherein there is incorporated a flashing mechanism 60. The flashing mechanism includes a contact arm 61 carrying contacts 62 and 63 adapted to engage with contacts 64 and 65, respectively, of switches F and G. The contact arm 61 is normally biased by spring 67 in a direction to open switch G and close switch F, thereby establishing a circuit from the heater 10 to the neutral line N of the power source. In the "off" position of the manual control, the cam 68 on the shaft 19 holds the contacts 62 and 63 in a position opening both switches F and G. Turning of the manually adjustable knob 20 in either direction from its "off" position results in one of the high points on the cam 68 moving the arm 61 to close switch G to establish a circuit from the heater to the line conductor L2 which provides 230 volts to the heater. The circuit from L2 to the switch G includes an electromagnetic device 71 which, when energized by movement of the manual control from "off," attracts and holds an armature 72 on the resilient contact arm 61, thereby retaining the switch G closed and the switch F open.

The heater 10 is connected to the other line conductor L1 by conductor 73, infinite switch 12, and either conductor 74 directly to the contact arm 25 of the temperature limiter 13 or through conductor 75, switch H and connector 76 to the arm 26 of the temperature limiter, and from the limiter to L1. When an initial flashing circuit is established from L2 to L1 via the flasher switch G, as shown in FIG. 5, the circuit also includes the cycling switch, and, as soon as the heater 10 reaches the temperature for which the manual selector has positioned the cycling switch, the latter will open in the usual manner, thereby interrupting the previously established circuit. Interruption of the circuit deenergizes the electromagnetic device 71, thereby releasing the resilient contact arm 61 of the flasher switch and permitting the tension spring 67 to move the arm 61 from a position closing switch G to a position opening that switch and closing switch F, thereby establishing a circuit from neutral to L1, providing 115 volts (FIG. 6).

The control shown in FIGS. 4 to 6 operates in the same manner as the control of FIGS. 1 to 3, insofar as the overheating protection afforded by the temperature limiter 13 is concerned. When operating in the "boil" range, the cam 80 on the shaft 19 permits the inherent resiliency of the contact arm 81 of switch H to move to switch-opening position, thereby limiting flow of current to the heater 10 to the circuit through connector 74 and switch B of the temperature limiter, the latter switch preventing the vessel 11 from exceeding 240° F. When the control is set for "fry" operation, the cam 80 moves the switch H to closed position, thereby providing a circuit through connector 75, switch H and connector 76, which bypasses switch B of the temperature limiter, thereby permitting the vessel to operate at any temperature under its limit of 450° F.

Figure 10:
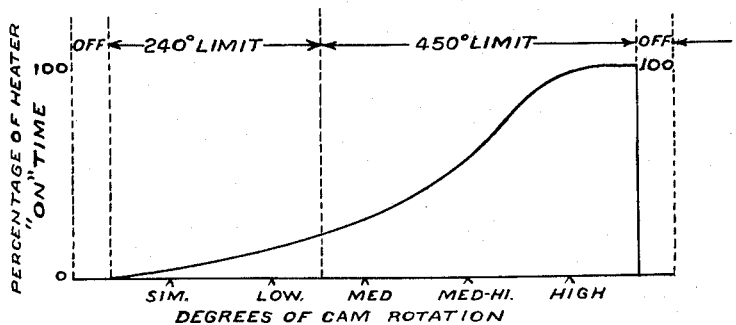
FIG. 10 is a graph illustrating the design of the infinite switch adjusting cam of the control shown in FIG. 9.

*FIGS. 9 and 10*

Where it is desired to effect preheating control of the surface heater 10, in order to shorten the time otherwise required to bring the vessel and its contents up to a suitable cooking temperature, the control as illustrated in FIG. 1 may be supplemented in the manner shown in FIG. 9, wherein parts corresponding to parts heretofore described in connection with FIG. 1 are designated by corresponding reference numerals.

The primary addition, contained in FIG. 9 as compared with FIG. 1, consists in the provision of an additional circuit for bypassing the heater 23 of the infinite switch 12a, this circuit comprising the conductors 101 and 102 which provide for flow of current from L1 directly to the fixed end of the bimetal arm 21 of the cycling infinite switch 12a, this circuit shunting the bimetal heater 23 which, when energized, heats the bimetal 21 and causes it to deflect downwardly to separate the normally engaged contacts 16 and 22. This additional circuit includes a switch J located within the temperature sensor 13a and comprising mating contacts carried near the free ends of resilient arms 103 and 104, mounted in fixed stacked relation, as at 105, with respect to the sensor cylindrical casing 28. This switch J is normally closed until the temperature of the vessel being heated on the surface heater 10 reaches a predetermined value approaching cooking temperature. Since during initial warm-up of a surface heater and of a vessel thereon, the temperature of a sensor such as 13a will lag the temperature of the heater and vessel, the control is designed to open the switch J at a sensor temperature somewhat lower than the vessel cooking temperature, for example a temperature in the vicinity of 160° F.

The sensor cap 30, which is biased against the bottom surface of the cooking vessel, carries in addition to the previously described bimetal 32, a bimetal 106 which senses the temperature of the vessel and deflects, with a rise in temperature, to the right as viewed in FIG. 9. In moving to the right, an insulating pin 107 carried at the free end of the bimetal 106 engages an extension 108 at the free end of the resilient contact carrying arm 104, and moves that arm and its associated contact to the right. The mating contact carried by the resilient arm 103 follows the contact of the arm 104 until the former abuts against the insulated stop 109, whereupon further movement of the arm 104 under influence of the bimetal 106 effects separation of the mating contacts and opening of the switch J, this opening preferably occurring, as previously indicated, at a temperature in the vicinity of 160° F.

It will be apparent that, upon opening of the switch J, shunting of the bimetal heater 23 in the infinite switch 12a is interrupted, with the result that current thereafter flows from L1 through the heater 23 and the mating contacts 16 and 22 to the switch arm 14 and the remainder of the previously described circuit including the surface heater 10. With the bimetal heater 23 now in the operating circuit, cycling of the infinite switch will result from periodic heating and cooling of the bimetal 21, in the manner previously described.

Two minor additional changes in FIG. 9, relative to FIG. 1, are as follows: The variable wattage adjusting cam 18a of the infinite switch 12a has its working surface so formed as to provide one continuous surface, as illustrated diagrammatically in the graph of FIG. 10, as distinguished from the cam 18 of FIG. 1 which has two separate surfaces 52 and 53 providing for an overlapping of the percentages of "on" time of the heater in the "boil" and "fry" ranges. The other change is concerned with the indicia provided on the control knob 20a, this indicia of FIG. 9 indicating an "off" position and a plurality of "on" positions marked for "Simmer," "Low," "Medium," "Medium High" and "High."

These various degrees of heat are indicated on the graph of FIG. 10 and it will be noted that the lower range of temperatures covers the "Simmer" and "Low" heats and has the previously indicated top temperature limit 240°, and the higher range includes "Medium," "Medium High" and "High" settings with the top temperature limit of 450°.

In the operation of the control of FIG. 9, the user turns the control knob 20a from its illustrated "off" position to any desired cooking position whereupon current flows from L1 to L2 via the heater 10 by a circuit traced as follows: From L1 through connector 101, contact carrying arm 104, switch J, contact carrying arm 103, connector 102, bimetal 21, contacts 22 and 16, contact carrying arm 14, connector 15, surface heater 10, connector 43, contact carrying arm 27, switches c and b, contact carrying arm 25, connector 38, switch d and contact carrying arm 39. Thus full wattage is supplied to the heater 10, to bring the cooking vessel 11 and its contents to a suitable cooking temperature rapidly. When the sensor bimetal 106 has reached a temperature of approximately 160° F. it will have deflected to the right a sufficient distance to open the switch J in the shunting circuit, thereby switching the current flow to the circuit previously described in connection with FIG. 1, i.e., from L1 through the heater 23 of the infinite switch, the contacts 22 and 16, the contact carrying arm 14 and the remainder of the circuit previously described. Thus, the infinite switch 12a will now cycle to provide the percentage of "on" time for the heater that is called for by the selected setting of the control knob 20. Operation of the top temperature limiter, if required by overheating of the vessel 11, will be as previously described in connection with the control of FIG. 1.

While the invention has been shown in several forms, it will be obvious to those skilled in the art that it is not so limited, but is susceptible of various other changes and modifications without departing from the spirit thereof.

What is claimed is:

1. Control apparatus for a surface heater adapted to support a vessel and comprising: circuitry for connecting the surface heater to a source of electrical energy, a variable wattage switch in said circuitry having a plurality of ranges of wattage input with each range containing a plurality of switch positions providing progressively higher wattage inputs, a temperature limiter associated with the heater and providing a single different predetermined temperature limit for each range of wattage input of said variable wattage switch, said temperature limiter comprising a plurality of switches, one for each temperature limit, together with a single temperature-responsive member for controlling said plurality of switches, and manually operable selector mechanism for adjusting the variable wattage switch to the desired wattage input position for the range being utilized and for simultaneously controlling the temperature limiter to render effective the predetermined temperature limit for that range.

2. Control apparatus for a surface heater adapted to support a vessel and comprising: circuitry for connecting the surface heater to a source of electrical energy, a variable wattage switch in said circuitry having a plurality of ranges of percentage of "on" time, temperature sensing and limiting mechanism in said circuitry having a single different temperature limit for each range of percentage of "on" time of the variable wattage switch and being adapted to sense the temperature of a vessel supported on the surface heater, said temperature sensing and limiting mechanism comprising a plurality of switches, one for each temperature limit, together with a single temperature-responsive member for controlling said plurality of switches, and manually operable selector mechanism for adjusting the variable wattage switch to the desired percentage of "on" time position for the particular range being utilized and for simultaneously controlling the temperature limiter to render effective the predetermined temperature limit for said particular range.

3. Control apparatus for an electric surface heater adapted to support a cooking vessel, comprising: circuitry for connecting the surface heater to a source of electrical energy, a variable wattage switch in said circuitry having a high range and a lower range of wattage input with each range containing a plurality of switch positions providing progressively higher wattage inputs with the lower end of the high range overlapping the upper end of the lower range, a temperature limiter associated with the heater and providing a single predetermined high temperature limit for said high range of wattage input and a single predetermined lower temperature limit for said lower range of wattage input, said temperature limiter comprising a first switch for the high range of wattage input and a second switch for the lower range of wattage input, and a single temperature-responsive member for controlling said first and second switches, and manually operable selector mechanism for adjusting the variable wattage switch to the desired wattage input position for the range of wattage input being utilized and for simultaneously controlling the temperature limiter to render effective the predetermined temperature limit for the utilized range of wattage input.

4. Control apparatus for a surface heater adapted to support a vessel and comprising: circuitry for connecting the surface heater to a source of electrical energy, a variable wattage switch in said circuitry having a plurality of ranges of wattage input with each range containing a plurality of switch positions providing progressively higher wattage inputs, a temperature limiter associated with the heater and providing a single different predetermined temperature limit for each range of wattage input of said variable wattage switch, said temperature limiter comprising a plurality of switches, one for each temperature limit, together with a single temperature-responsive member for controlling said plurality of switches, and manually operable selector mechanism including a single control knob for adjusting the variable wattage switch to the desired wattage input position of the range being utilized and for controlling the temperature limiter to render effective the predetermined temperature limit for that range.

5. Control apparatus for a surface heater adapted to support a vessel and comprising: circuitry including a pair of circuits for connecting the surface heater to a source of electrical energy; a variable wattage switch in said circuitry having a plurality of positions providing different wattage inputs; a temperature limiter associated with the heater and including: a temperature sensing element disposed adjacent the center of said heater and adapted to be biased into contact with the bottom of a vessel supported on said heater, a bimetal positioned to be heated by said temperature sensing element, and a pair of switches with one switch in each circuit of said pair of circuits, said switches being adapted to be opened by said bimetal at different preselected vessel temperatures sensed by said temperature sensing element; and manually operable control means for positioning said variable wattage switch and for rendering effective one or the other circuit of said pair of circuits.

6. Control apparatus for a surface heater adapted to support a vessel, comprising: circuitry for connecting the surface heater to a source of electrical energy, an infinite switch in said circuitry having a high range and a lower range of percentage of "on" time with each range containing a plurality of switch positions providing progressively higher percentages of "on" time, said infinite switch including means for effecting cycling of said switch and said circuitry including means for normally rendering ineffective the switch cycling means, a temperature limiter associated with the surface heater and providing a single different predetermined temperature limit for each range of percentage of "on" time of said infinite switch, said temperature limiter including means responsive to sensing of a predetermined temperature of a vessel supported on the surface heater for rendering inoperative the means for normally rendering ineffective the switch cycling means, and manually operable selector mechanism including a single control knob for adjusting the infinite switch to the desired percentage of "on" time position in the range being utilized and for controlling the temperature limiter to render effective the predetermined temperature limit for that range.

7. Control apparatus for a surface heater adapted to support a vessel and comprising: circuitry including a pair of circuits for connecting the surface heater to a source of electrical energy; a variable wattage switch in said circuitry having a plurality of positions providing different wattage inputs and including a bimetal and a heater therefor for cycling said switch; a temperature limiter associated with the surface heater and including a temperature sensing element disposed adjacent the center of said surface heater and adapted to be biased into contact with the bottom of a vessel supported on said surface heater, temperature responsive means positioned to be heated by said temperature sensing element, a pair of switches with one switch in each circuit of said pair of circuits, said switches being adapted to be opened by said temperature responsive means at different preselected vessel temperatures sensed by said temperature sensing element; said circuitry including a third circuit for shunting the bimetal heater of said variable wattage switch to prevent cycling of said variable wattage switch; said temperature limiter including a third switch in said third circuit adapted to be opened by the temperature responsive means at a predetermined vessel temperature sensed by the temperature sensing element; and manually operable control means for positioning said variable wattage switch and for rendering effective one or the other circuit of said pair of circuits.

8. Control apparatus for a surface heater adapted to support a vessel and comprising: means for conducting heating medium to said heater, means for controlling flow of heating medium through said conducting means, said flow control means providing a plurality of ranges of heat output for said heater and including a movable member having a plurality of positions for each range of heat output, each of said plurality of positions providing progressively higher heat outputs for the heater, a temperature limiter associated with said heater and providing a single different predetermined temperature limit for each range of heat output of the heater, said temperature limiter comprising a plurality of switches, one for each temperature limit, together with a single temperature-responsive member for controlling said plurality of switches, and manually operable selector mechanism for adjusting the movable member of the flow control means to the position producing the desired heat output of the heater within the range being utilized and for simultaneously controlling the temperature limiter to render effective the predetermined temperature limit for that range.

9. Control apparatus for a surface heater adapted to support a vessel and comprising: means for conducting heating medium to said heater, means for controlling flow of heating medium through said conducting means, said flow control means providing a plurality of range of heat output for said heater and including a movable member having a plurality of positions for each range of heat output, each of said plurality of positions providing progressively higher heat output for the heater, temperature sensing and limiting mechanism associated with said heater and providing a single different predetermined temperature limit for each range of heat output of the heater, manually operable selector mechanism for adjusting said movable member of the flow control means to the position producing the desired heat output of the heater within the range being utilized and for simultaneously controlling the temperature sensing and limiting mechanism to render effective the predetermined temperature limit for that range, said means for conducting heating medium including a portion bypassing at least a sufficient part of the flow control means to render the latter ineffective to control flow of the heating medium, and said temperature sensing and limiting mechanism including means responsive to sensing of a predetermined temperature of a vessel supported on the surface heater for rendering said bypassing means ineffective.

References Cited in the file of this patent

UNITED STATES PATENTS

| | | |
|---|---|---|
| 2,790,056 | Fry | Apr. 23, 1957 |
| 2,815,428 | Pearce | Dec. 3, 1957 |
| 2,816,203 | Weeks | Dec. 10, 1957 |
| 2,883,506 | Jordan | Apr. 21, 1959 |
| 2,913,562 | Weber et al. | Nov. 17, 1959 |
| 2,919,337 | Brosseau et al. | Dec. 29, 1959 |